United States Patent
Kamimura

[11] Patent Number: 5,961,221
[45] Date of Patent: Oct. 5, 1999

[54] CROSS ROLLER BEARING AND CORIOLIS GEAR DEVICE

[75] Inventor: Ichirou Kamimura, Hiroshima, Japan

[73] Assignee: Namu Co., Ltd., Hiroshima, Japan

[21] Appl. No.: 08/991,989

[22] Filed: Dec. 17, 1997

[30] Foreign Application Priority Data

Dec. 28, 1996 [JP] Japan .................................. 8-358651

[51] Int. Cl.[6] .......................... F16C 19/50; F16C 19/40; F16C 33/60
[52] U.S. Cl. ......................... 384/447; 384/551; 384/570; 384/571; 384/619
[58] Field of Search .................................. 384/548, 551, 384/565, 567, 568, 570, 571, 618, 619, 447

[56] References Cited

U.S. PATENT DOCUMENTS

| | | | |
|---|---|---|---|
| 2,040,741 | 5/1936 | Hoke | 384/571 |
| 2,734,786 | 2/1956 | McNicoll | 384/447 |
| 4,023,869 | 5/1977 | Caldwell | 384/567 |
| 4,746,232 | 5/1988 | Gugel | 384/619 |
| 4,915,513 | 4/1990 | Orain | 384/551 X |
| 4,974,972 | 12/1990 | Boosler, Jr. et al. | 384/619 X |

FOREIGN PATENT DOCUMENTS

| | | |
|---|---|---|
| 2-17214 | 2/1990 | Japan . |
| 5-11379 | 2/1993 | Japan . |

*Primary Examiner*—Thomas R. Hannon
*Attorney, Agent, or Firm*—Oliff & Berridge, PLC

[57] ABSTRACT

A cross roller that may rotate at a high speed with high precision is provided. A first conical roller 7 for receiving loads in a first axial direction B and a radial direction and a second conical roller 8 for receiving loads in a second axial direction A and the radial direction are alternatively held by an inner race 3 and an outer race 4. Also, a predetermined space 9 is provided between large end faces 7b and 8b of the first and second conical rollers 7 and 8 and orbital surfaces 4a and 4b of the outer race 4. Then, a seat ring 10 that is elastically deformable is provided in the space 9. By using the conical rollers 7 and 8, a slippage between the orbital surfaces 3a, 3b, 4a and 4b and the rollers 7 and 8 is prevented. Also, the seat ring 10 is elastically deformed so that a suitable pre-pressure is applied to the first and second conical rollers 7 and 8 by its restoring force. Accordingly, it is possible to always impart a suitable pre-pressure to the conical rollers 7 and 8 to thereby perform the rotational operation at a high speed with high precision. (FIG. 1)

6 Claims, 15 Drawing Sheets

F I G . 10
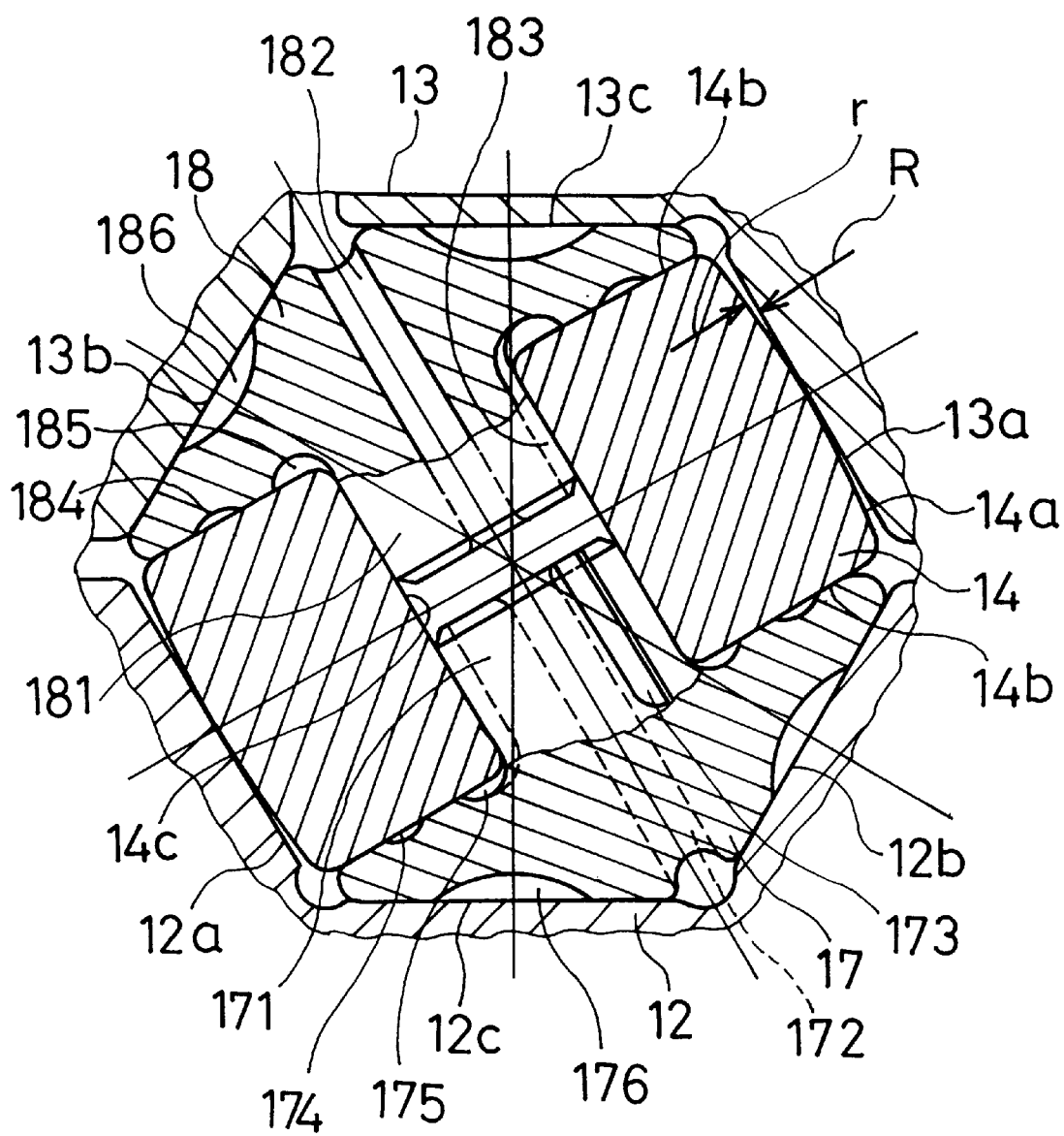

CROSS ROLLER BEARING AND CORIOLIS GEAR DEVICE

BACKGROUND OF THE INVENTION

1. Field of the Invention

The present invention relates to a cross roller bearing device that may receive a load in universal directions with a single bearing.

2. Description of the Related Art

In a conventionally well known conical roller bearings (see FIG. 15), a rotary centerline of each conical roller is slanted so that a load both in an axial direction and in a radial direction may be received. However, the axial load that may be received by the conical roller bearing is limited to one direction (a load from a back side). Accordingly, in order to make it possible to receive both in a first axial direction indicated by an arrow A and in a second axial direction indicated by an arrow B in FIG. 15, it is necessary to use the two conical roller bearings in face-to-face relation as shown in FIG. 16. (In case of FIG. 16, since front surfaces of the bearings are caused to face each other, this is a front surface combination bearing. Inversely, the back-to-back combination bearing is referred to as a back surface combination bearing.) This causes defects in space efficiency and in weight increase.

Accordingly, there is provided a cross roller bearing device in which loads in the first and second axial directions and in a radial direction may be received by a single bearing. FIG. 17 shows the cross roller bearing 1. FIG. 18 is a cross-sectional view showing a portion taken along the line D—D of FIG. 17. In the cross roller bearing, the rollers 2 are alternatively disposed on the same orbit so that centerlines $C_1$ and $C_2$ of the adjacent rollers 2 are arranged to intersect with each other, and the rollers 2 are clamped by an inner race 3 and an outer race 4. Orbital surfaces 3a, 3b, 4a and 4b that form angles of 45 relative to the centerlines C are formed in the inner race 3 and the outer race 4, respectively. The rolling surfaces of the rollers 2 with the centerlines intersecting with each other are brought into contact with a pair of orbital surfaces 3a and 4a or a pair of orbital surfaces 3b and 4b.

A retainer 5 is disposed between the respective adjacent rollers 2. As shown in FIG. 19, the retainer 5 has contact surfaces 5a and 5b having substantially the same inner diameter as the roller diameter so that the retainer 5 may be in surface contact with the rolling surfaces of the adjacent rollers 2. The centerlines $C_1$ and $C_2$ of the contact surfaces 5a and 5b are arranged to intersect with each other. Then, each roller 2 may rotate while being positioned within the orbit of the bearing and keeping the suitable contact condition with the orbital surfaces, by the contact surfaces 5a and 5b. The above-described conventional cross rollers are described in detail in Japanese Utility Model Publication No. Hei 2-17214 and Japanese Utility Model Publication No. Hei 5-11379, for instance.

However, the conventional cross rollers suffer from the following disadvantages. The explanation will be given in conjunction with FIG. 18. With respect to the roller that rotates with the rolling surface 2a in contact with the orbital surfaces 3a and 4a, the orbital surfaces 3b and 4b serves as guide surfaces for supporting the end faces 2b of the roller 2. However, with respect to the roller located in front of or behind this roller 2, its rolling surface 2a is in contact with the orbital surfaces 3b and 4b, and the orbital surfaces 3a and 4b serve as guide surfaces for supporting the end faces 2b. Namely, each orbital surfaces must have the same diameter and length of the roller in order to work as the guide surfaces as well. Also, its cross-sectional shape should be the same even in any direction of the centerline of the roller. For this reason, it is impossible to use the conical roller as the roller of the cross roller bearing.

By the way, each orbital surface forms an angle of 45° with respect to the centerline of the bearing. Accordingly, the circumferential length of the portion $P_1$ is different from that of the portion $P_2$. (The circumferential length through $P_2$ is longer than that through the portion $P_1$.) However, the roller 2 which is in contact with each orbital surface which is different in circumferential length in places has the constant diameter. A slippage would be caused between the roller 2 and the respective orbital surfaces. In order to enhance the rotational precision of the bearing, it is necessary to impart a pre-pressure to the roller by the inner race and the outer race to some extent. However, since the frictional heat is generated by the above-described slippage, it is necessary to limit the application of the pre-pressure to some extent for avoiding the thermal sticking. Also, for the same reason, the bearing is not suitable for the high speed rotation.

SUMMARY OF THE INVENTION

In view of the above-noted defects, an object of the present invention is to provide a cross roller in which a slippage between a roller rolling surface and an orbital surface of an inner race and an orbital surface of an outer race are prevented so that the bearing may well work at a high speed with a high load with a high precision to thereby expand an applicable field of the cross roller. Also, the cross roller may be used as a bearing of a Coriolis gear device to thereby reduce a size of the Coriolis gear device.

In order to attain this and other object, according to claim 1 of the invention, there is provided a cross roller bearing for supporting rollers, having different directional rotary axes with common inner and outer races, characterized in that a first conical roller for receiving loads in a first axial direction and a radial direction and a second conical roller for receiving loads in a second axial direction and the radial direction are alternatively arranged, a predetermined space is provided between large end faces of the first and second conical rollers and orbital surfaces of the outer race, and a seat ring that may be elastically deformed is provided in the space.

With such an arrangement, a slippage between the orbital surfaces and the rollers is prevented by using the conical rollers. Also, a predetermined space is provided between large end faces and of the first and second conical rollers and orbital surfaces of the outer race. Then, a seat ring that is elastically deformable is provided in the space. The seat ring is elastically deformed so that a suitable pre-pressure is applied to the first and second conical rollers by its restoring force.

Also, in a cross roller bearing according to claim 2 of the invention, it is preferable that the seat ring forms a U-shaped cross section having an open end portion directed radially outwardly, and the radially outward end portion is used as a contact portion with the outer race, whereas a radially inward end portion thereof is used as a contact portion with large end faces of the first and second conical rollers. Then, the open end portions of the rollers are subjected to a load from the outer race and the radial inward end portion forming the curved surface is uniformly subjected to the load from the large end faces of the rollers having different rotary centerlines so that the seat ring is deformed.

Furthermore, in a cross roller bearing according to claim 3 of the invention, for supporting rollers, having different directional rotary axes with common inner and outer races, it is characterized in that a plurality of pairs of orbital surfaces having different angles relative to a center axis are provided in the inner and outer races, a relationship, R>r, is established where R is the radius of the orbital surfaces in radial cross section and r is the radius of rolling surfaces of rollers guided by the orbital surfaces, in radial cross section, and retainers that are elastically deformable are disposed in respective spaces defined by end faces of the rollers and the orbital surfaces so that the adjacent retainers may be in contact with each other.

Then, the plurality of pairs of orbital surfaces having the different angles relative to the center axis are provided and the rollers are disposed for the respective orbital surfaces so that the rollers are subjected to the loads both in the axial directions and the radial cross section. The relationship between R and r, in radial cross section, of the respective orbital surfaces and the rolling surfaces of the rollers is R>r. When the rollers are rotated by the loads from the respective orbital surfaces, the mutual contact points are moved so as to balance the directions of the working forces generated between the respective orbital surfaces and the rolling surfaces of the rollers to thereby change suitably the angles between the rollers and the orbital surfaces. In this case, the contact points are moved to a position where the circumferential length of the orbital surfaces and the circumferential length of the rolling surfaces are identical with each other, resulting in prevention of the slippage between the orbital surfaces and the rolling surfaces of the rollers. The retainers that may be elastically deformed as desired in a center axis direction of the roller are disposed in the respective spaces defined by the end faces of the rollers and the orbital surfaces to thereby receive the angular change of the rollers. Also, the adjacent retainers are in contact with each other to position the respective rollers without fail.

Also, in a cross roller bearing according to claim 4 of the invention, through holes are formed through center axes of the rollers and axial portions that engage with the through holes are formed in the retainers. The through holes are formed in the center axes of the rollers so that the rollers are liable to be deformed when they receive the loads. Then, the rotating surfaces are deformed in elliptical shapes upon the application of the load so that the radius of the portions that contact with the orbital surfaces of the race is increased to thereby reduce the Hertz stress generated between the rolling surfaces of the rollers and the orbital surfaces of the races. Also, since the retainers have the axial portions engaged with the through holes, it is possible to move the retainers also in accordance with the movement of the rollers.

Furthermore, in a cross roller bearing according to claim 5 of the invention, it is preferable that the number of the orbital surfaces are three or more pairs. By increasing the number of the orbital surfaces in this manner, it is possible to direct the orbital surfaces of the rollers in various directions.

Also, in a Coriolis gear device according to claim 6 of the invention, it is characterized in that the cross roller bearing according to claim 1–5 of the invention, is used in a bearing for gears. Then, it is possible to reduce the volume of the bearing occupying the Coriolis gear device to thereby miniaturize the Coriolis gear device.

BRIEF DESCRIPTION OF THE DRAWINGS

In the accompanying drawings:

FIG. 10 is an enlarged view of a primary part of FIG. 7;

DESCRIPTION OF THE PREFERRED EMBODIMENTS

Figure 1:
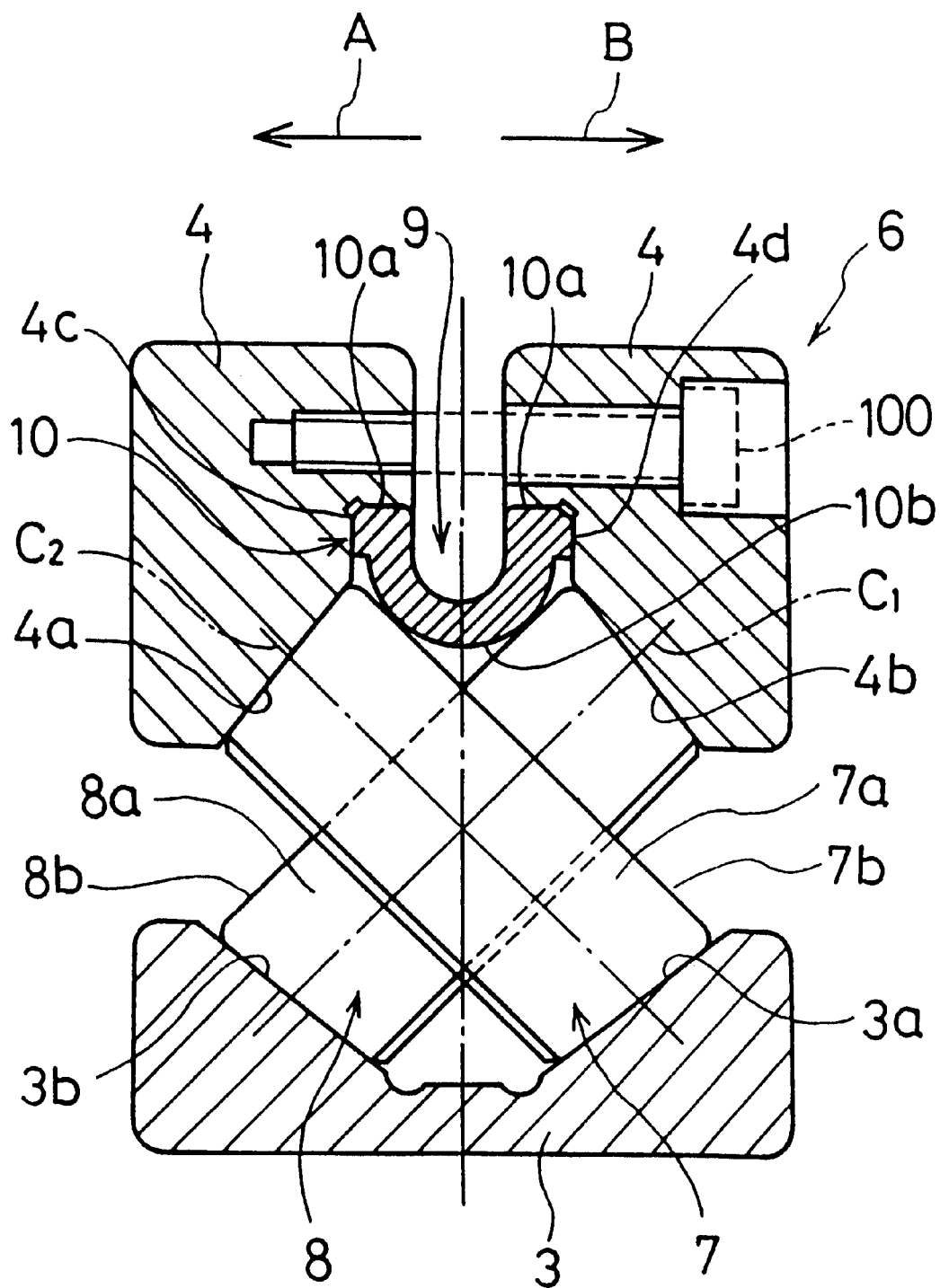
FIG. 1 is a cross-sectional view showing a cross roller bearing according to a first embodiment of the invention.

A first embodiment of the present invention will now be described with reference to FIGS. 1 through 6. In this case, the same reference numerals are used to designate the like components or members and the duplication of explanation of each component will be omitted.

FIG. 1 is a cross-sectional view showing a cross roller bearing 6 in accordance with the first embodiment of the invention. A centerline of the cross roller bearing extends in the right and left directions of FIG. 1. In the following description, a direction indicated by the arrow A is referred to as a first axial direction, and a direction indicated by the arrow B is referred to as a second axial direction. The cross roller bearing 6 supports conical rollers 7 and 8, whose centerlines are different in direction, by an inner race 3 and an outer race 4. Among these, the conical roller 7 is a roller (first conical roller) for receiving the loads in the second axial direction and a radial direction (vertical direction in FIG. 1). The conical roller 8 is a roller (second conical roller) for receiving the load in the first axial direction and the radial direction. These first and second conical rollers 7 and 8 are alternatively arranged.

Also, annular grooves 4c and 4d are formed in orbital surfaces 4a and 4b of the outer race 4. A space 9 is formed between large end faces 7b and 8b of the conical rollers 7 and 8 and orbital surfaces 4a and 4b of the outer race by the annular grooves 4c and 4d. A seat ring 10 which is elastically flexible or deformable is disposed in the space 9.

Figure 2A:
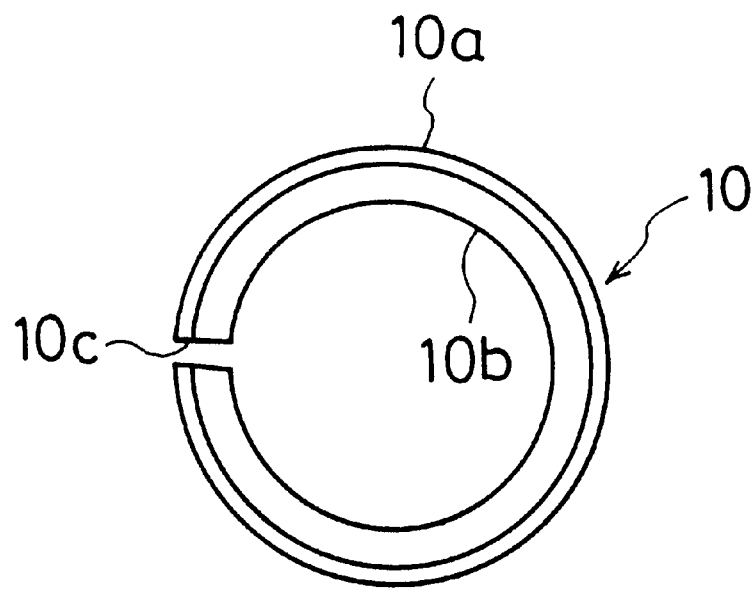
FIGS. 2(a) and 2(b) are frontal views showing seat rings shown in FIG. 1.
Figure 2B:
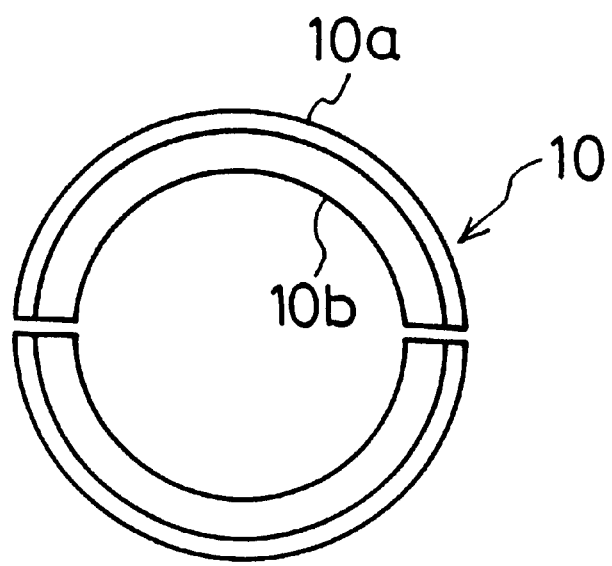

An open end portion of the seat ring 10 has a U-shaped cross-section directed radially outwardly. Then, the radially outward end portions 10a are in contact with the outer race 4. Also, a radially inward end portion 10b is in contact with the large end faces 7b and 8b of the conical rollers 7 and 8. Incidentally, a small gap (not shown) is formed between the above-described radially inward end portion 10b and the large end faces 7b and 8b in order to make it possible to feed lubricant therebetween. It is preferable that a spring member that may be elastically deformed as desired be used as the seat ring 10. Then, as shown in FIG. 2(a), a slit 10c is formed at a single position of the ring. The ring is expanded by the slit 10c for the sake of easy assembly. Also, as shown in FIG. 2(b), there may be cases of two division type. In any way, the division portions of the ring may be formed by wire cutting to thereby reduce the gap as much as possible. Thus, the free end portions of the seat ring 10 is formed in a U-shaped in cross section directed radially outwardly so that the curved radially inward end portion 10b is brought into uniform contact with the large end face 7b and 8b of any one of the conical rollers 7 and 8, and the radially inwardly end portion 10a is in sufficiently intimate contact with the annular grooves 4c and 4d of the outer race 4 to thereby generate the sufficient seat force to be described later.

Figure 19:
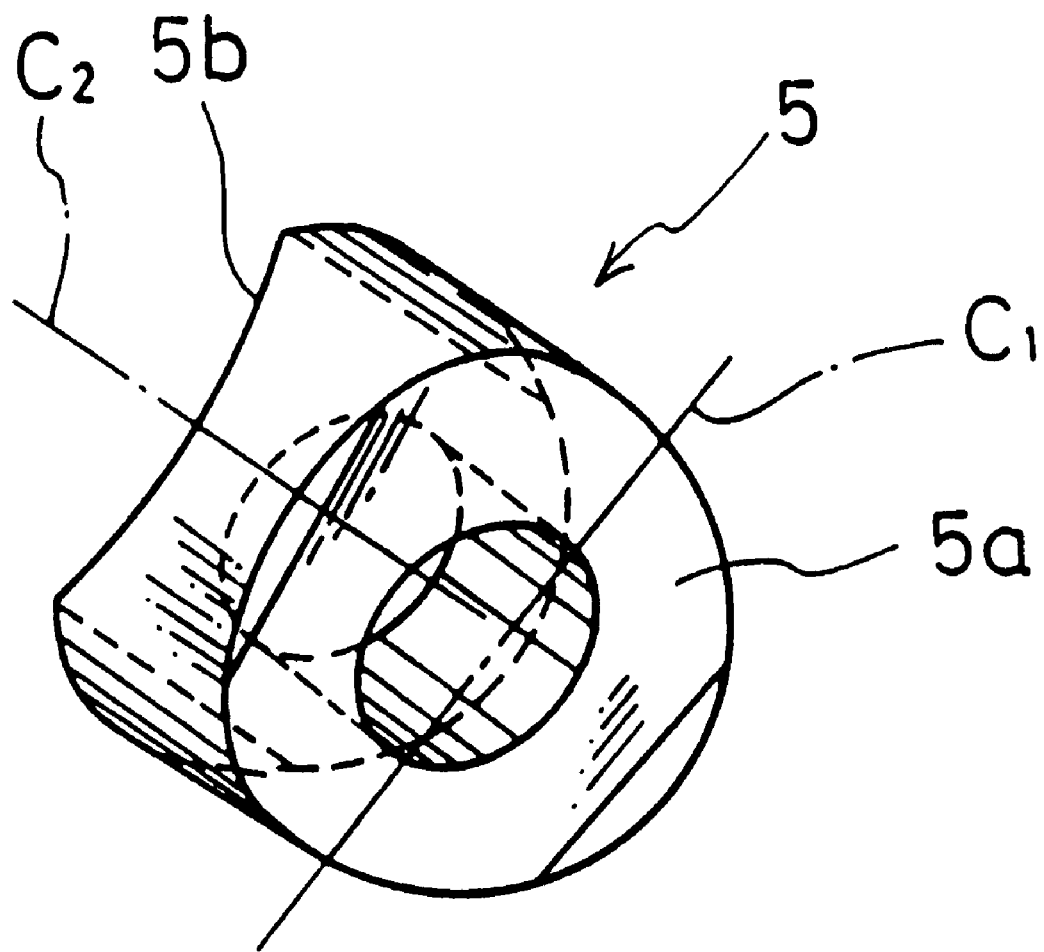
FIG. 19 is a perspective view showing a retainer shown in FIG. 17.

Incidentally, in the embodiment, the outer race 4 is divided into four segments. An engagement member 100 such as a bolt for coupling the segments is indicated by dotted lines. Although not shown, also in the embodiment, the retainer as described in conjunction with FIG. 19 may be disposed between the adjacent conical rollers 7 and 8.

Figure 3:
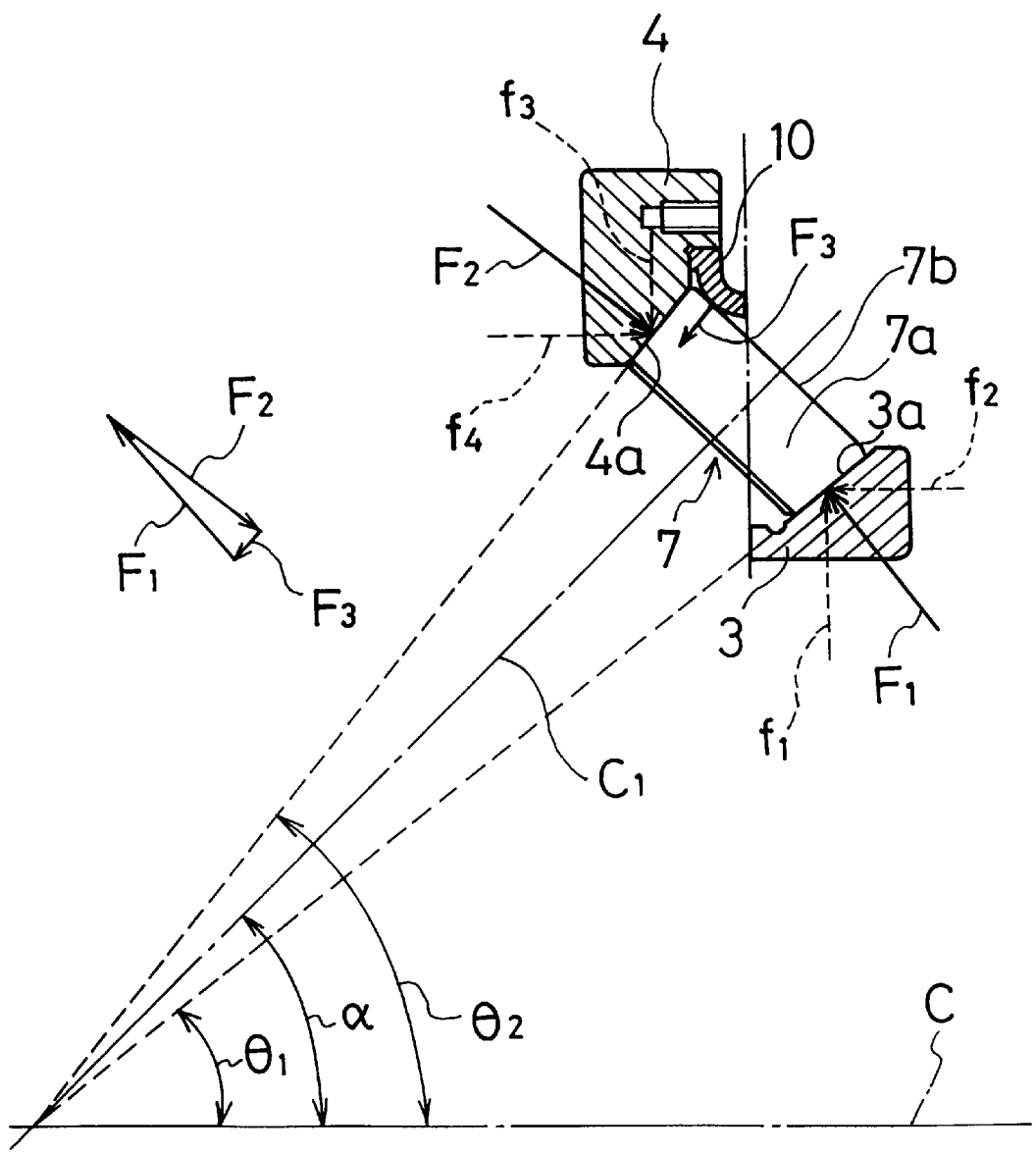
FIG. 3 is a view showing a concept of the relationship of forces applied to the respective components when the cross roller bearing shown in FIG. 1 is subjected to a load.

By the way, a relationship of the forces applied to the respective components when the cross roller bearing 6 having the above-described structure is subjected to a load will now be described with reference to FIG. 3. Incidentally, for the sake of the explanation, FIG. 3 shows only an upper half of the seat ring 10, the conical roller 7 and the orbital surfaces 3a and 4a with which the rotating surface 7a contacts.

A radial load $f_1$ and a thrust load $f_2$ are applied from the orbital surface 3a to the rolling surface 7a of the conical roller 7. These composite forces are referred to as a composite force $f_1$. Also, a radial load $f_3$ and an axial force $f_4$ are applied from the orbital surface 4a to the rolling surface 7a. These composite forces are referred to as a composite force $F_2$. By the way, extension lines of the orbital surfaces 3a and 4a with which the conical roller 7 contacts are caused to intersect on the centerline C of the bearing as shown in FIG. 3. Namely, there is a difference between an angle $\theta_1$ defined by the orbital surface 3a and the centerline C and an angle $\theta_2$ defined by the orbital surface 4a and the centerline C. Accordingly, there is a vector difference between the composite forces $F_1$ and $F_2$. Accordingly, a third force $F_3$ is needed for closing a triangle of the forces including the composite forces $F_1$ and $F_2$. In general, this force $F_3$ is referred to as a seating force. This seating force $F_3$ may be obtained by the elastic force generated by the elastic deformation of the seat ring 10.

When the composite forces $F_1$ and $F_2$ are increased and the large end face 7b of the conical roller 7 is strongly pressed against the seat ring 10, the seat ring 10 is more elastically deformed to increase the seating force $F_3$. Inversely, when the composite forces $F_1$ and $F_2$ are decreased and the large end face 7b of the conical roller 7 is weakly pressed against the seat ring 10, the seat ring 10 is less elastically deformed to decrease the seating force $F_3$. Namely, it is possible to always apply the suitable seating force to the large end face 7b of the conical roller 7 from the seat ring 10. Then, the conical roller 7 is correctly guided to the orbital surfaces 3a and 4a so that it is possible to perform the precise operation without any displacement. Incidentally, of course, the above-described relationship of the forces may be applied to the conical roller 8.

Figure 4:
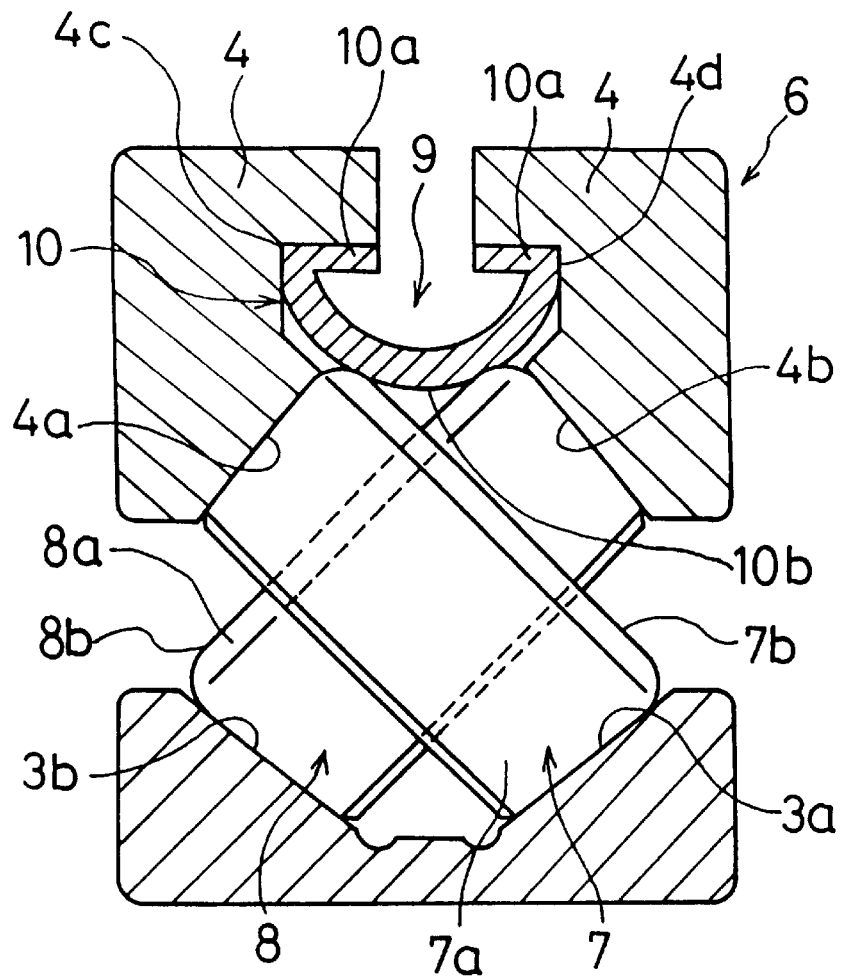
FIG. 4 is a schematic view showing an application example of the cross roller bearing shown in FIG. 1.
Figure 5:
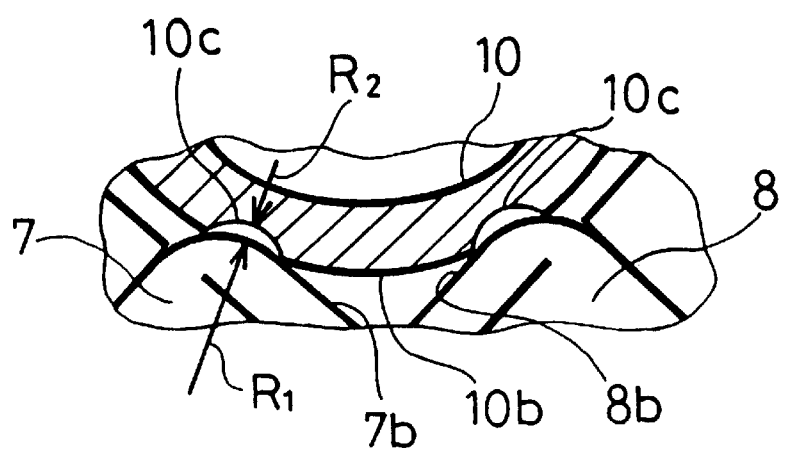
FIG. 5 is an enlarged view of a primary part of FIG. 4.

FIGS. 4 and 5 show an application example according to the first embodiment. The same reference numerals are used to designate the like members or components of FIG. 1. In this case, the end portions between the large end faces 7b and 8b and the rolling surfaces 7a and 8a of the conical rollers 7 and 8 are polished to have a radius $R_1$ as shown in FIG. 5. Also, recess portions 10c having a spherical shape or arcuate groove having a radius $R_2$ are formed in the inner end portion 10b of the seat ring 10 as shown in FIG. 5. Then, the above-described conical roller end portions having the radius $R_1$ are engaged with the recesses 10c. Here, the relationship, $R_1 > R_2$, is established between the radii $R_1$ and $R_2$.

With such a structure, in the case where the load applied to the cross roller bearing 6 is zero or very small, the contact condition between the seat ring 10 and the conical rollers 7 and 8 becomes a point contact. However, when a load is applied to some extent, the recess portions 10c is deformed so that the radius $R_1$ is changed to define an arcuate shape having a greater radius. As a result, the contact relationship between the recess portions 10c and the end portions of the conical rollers 7 and 8 becomes a surface contact. In this case, the lubricant is retained in the recess portions 10c. A film of oil is formed between the recess portions 10c and the conical rollers 7 and 8. Accordingly, the surface pressure between the conical rollers 7 and 8 and the seat ring 10 is decreased to thereby prevent a fatigue fracture.

The advantages obtained by the first embodiment with the above-described structure are as follows. In the embodiment, since the conical rollers 7 and 8 are used as the rollers constituting the cross rollers, no slippage is generated between the rolling surfaces 7a and 8a of the conical rollers 7 and 8 and the orbital surfaces 3a and 3b of the inner race 3 and the orbital surfaces 4a and 4b of the outer race 4. Accordingly, there is no thermal sticking due to the generation of frictional heat. Also, in the case where the conical rollers are used, it is necessary to apply the seating force $F_3$ to the large end faces 7b and 8b of the respective conical rollers 7 and 8. It is possible to suitably generate the seating force by the deformation of the seating ring 10. Also, even if a pre-pressure is applied to the rollers, the seating ring 10 is deformed so that it is possible to suitably adjust the seating force $F_3$ and at the same time, since it is possible to expect the cushioning action in comparison with the fixed seat, there is no fear that an infinite force is applied as in the fixed seat. Accordingly, it is possible to prevent the damage of this portion, and to avoid the heat stick caused by the damage. Accordingly, it is possible to apply a suitable pre-pressure to form the bearing having a high rotation precision. For these reasons, it is possible to obtain the cross roller bearing suitable for the high speed rotation.

Figure 6:
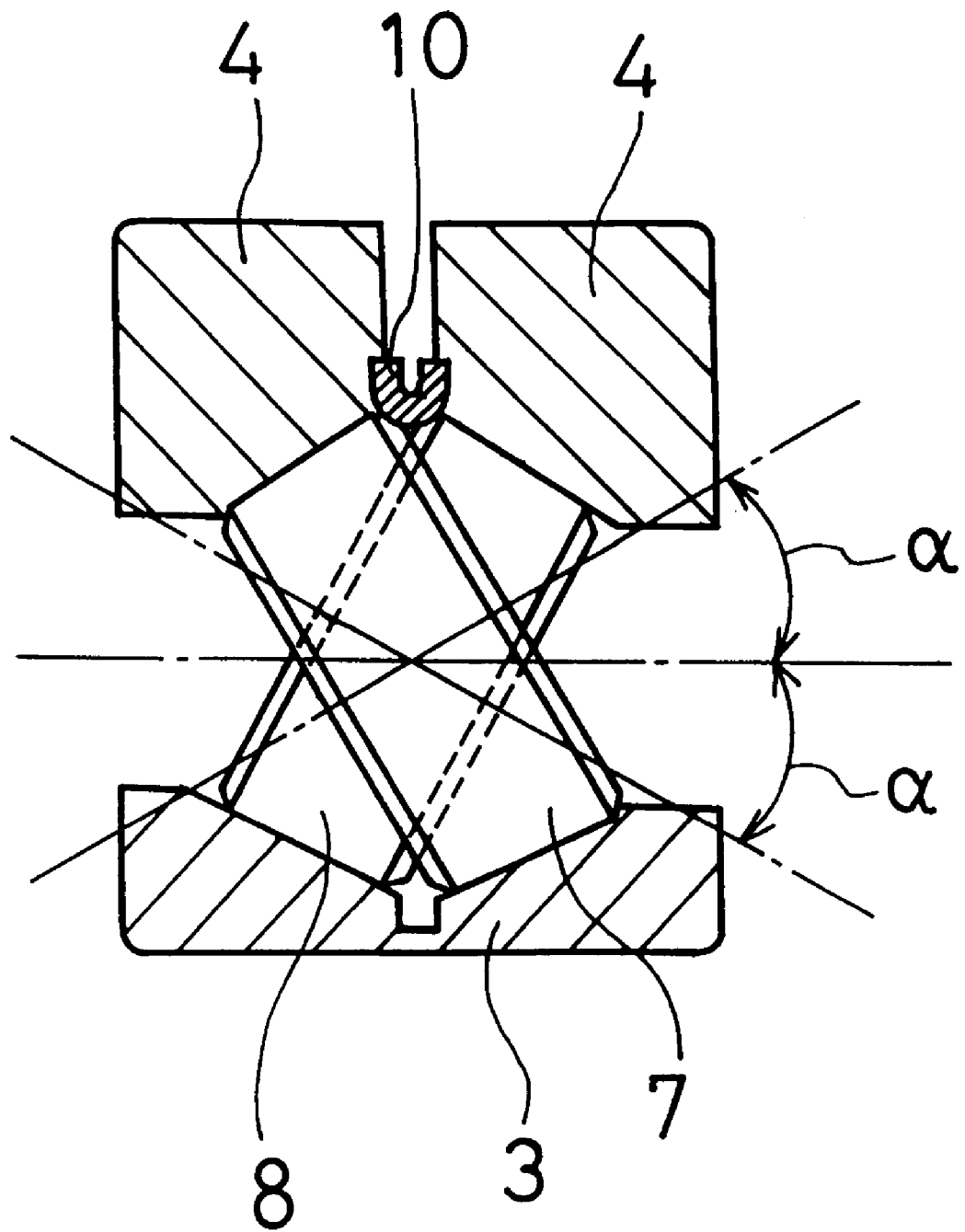
FIG. 6 is a cross-sectional view showing another application example of the cross roller bearing in accordance with the first embodiment of the invention.

Also, the seat ring 10 is interposed between the large end faces 7b and 8b of the conical rollers 7 and 8 and the outer race 4 to thereby generate the seating force $F_3$ by the seat ring 10. Thus, it is unnecessary to guide the rollers only by the configuration of the orbital surfaces and the rollers. Therefore, the shape of the rollers and the orbital surfaces is not limited. Accordingly, it is unnecessary to limit to 45° the angle α defined by the centerlines $C_1$ and $C_2$ of the conical rollers 7 and 8 and the centerline C of the cross roller bearing (see FIG. 3). Then, if angle α<45°, it is possible to receive more load in the radial direction. Also, if angle α<45°, it is possible to receive more load in the axial direction. FIG. 6 shows a case where α=30° is established. Thus, even if the angle α is changed variously, it is possible to impart the suitable seating force $F_3$ by the seating ring 10 and to obtain the rotation with high precision at a high speed.

A second embodiment of the invention will now be described with reference to FIGS. 7 to 13. In this case, the same reference numerals are used to designate the like components or members of the first embodiment and the duplication of explanation of each component will be omitted.

Figure 7:
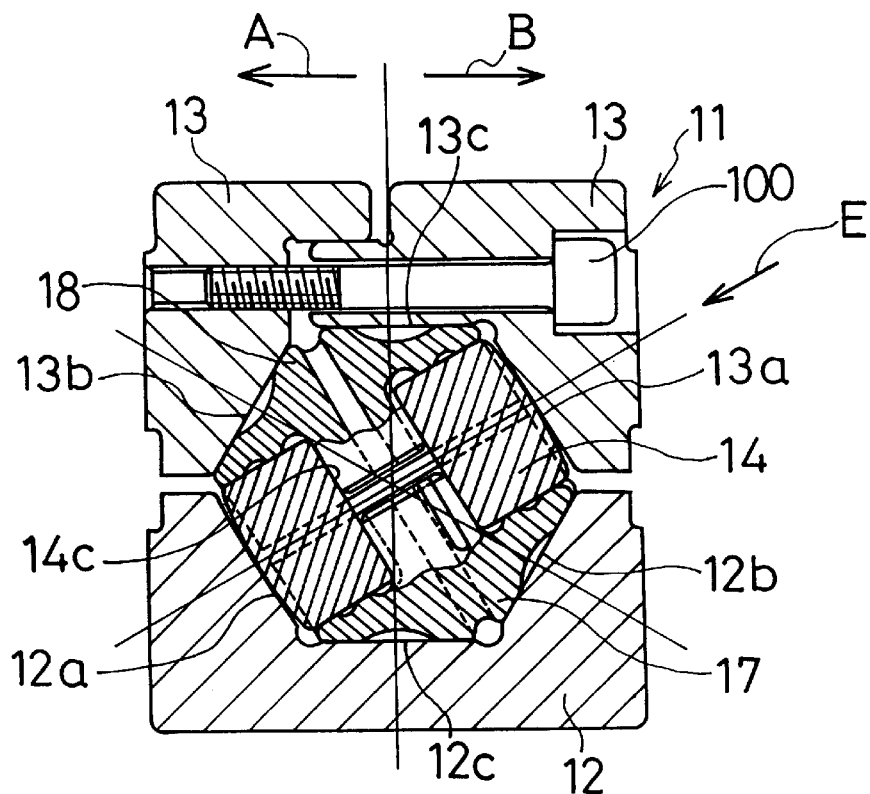
FIG. 7 is a cross-sectional view showing a cross roller bearing according to a second embodiment of the invention.
Figure 8:
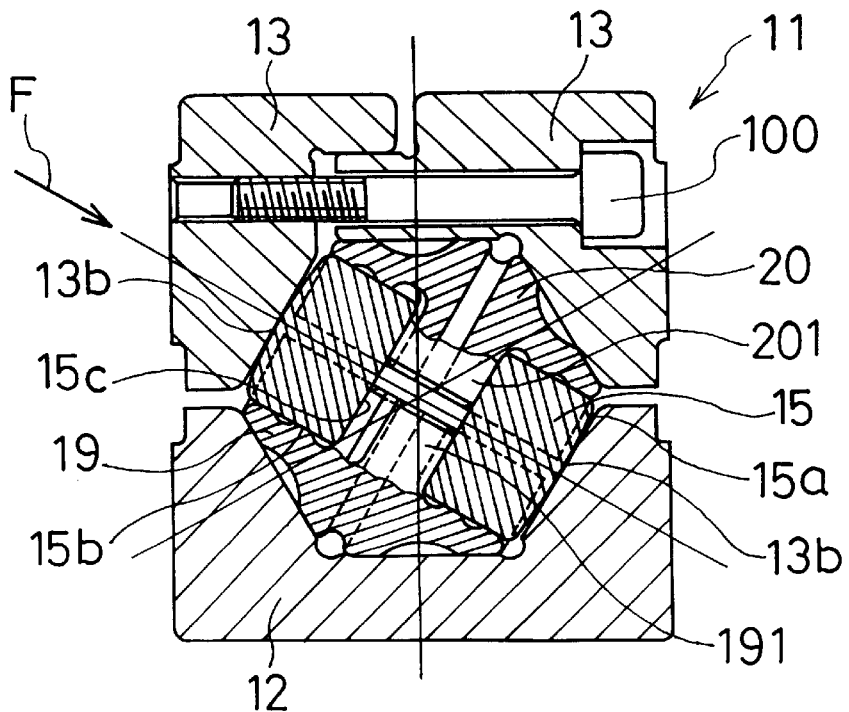
FIG. 8 is a cross-sectional view showing the cross roller bearing according to the second embodiment of the invention in a position different from that of FIG. 7.
Figure 9:
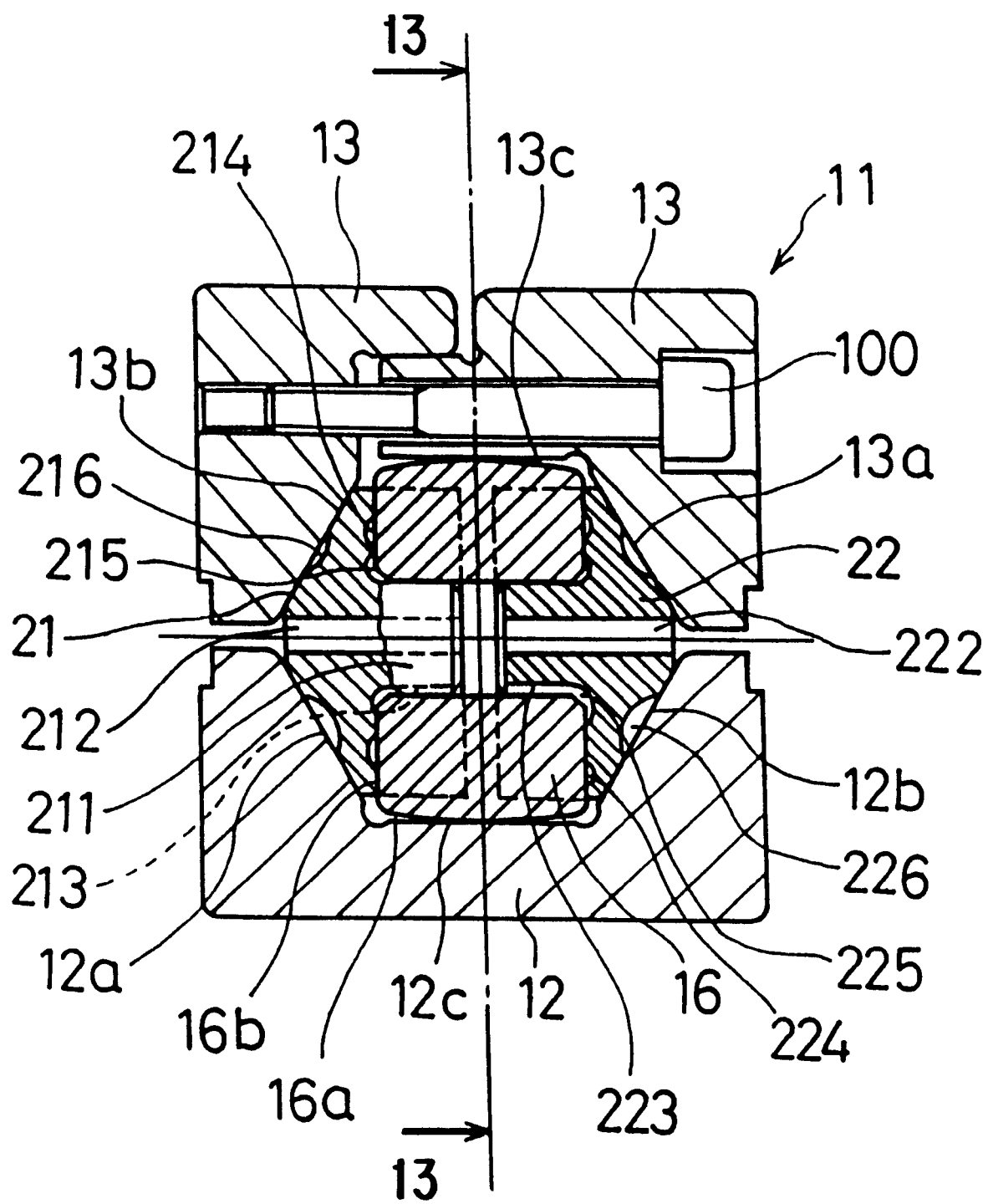
FIG. 9 is a cross-sectional view showing the cross roller bearing according to the second embodiment of the invention in a position different from those of FIGS. 7 and 8.

FIGS. 7 to 9 are cross-sectional views of a cross roller bearing 11 in accordance with the second embodiment of the invention. The center axis (not shown) of the cross roller bearing 11 is extending in the right and left direction of FIGS. 7 to 9. A plurality of orbital surfaces 12a, 12b, 12c, 13a, 13b and 13c are provided on the inner race 12 and the outer races 13. The orbital surfaces 12a and 13a, 12b and 13b, and 12c and 13c are paired, respectively. The angles of the respective orbital surfaces are different with respect to the center axis of the bearing. In the example shown in the figure, the pair of orbital surfaces 12a and 13a form an angle of +30° with respect to the center axis of the bearing, the pair of orbital surfaces 12b and 13b form an angle of −30° with respect to the center axis of the bearing, and the pair of orbital surfaces 12c and 13c form a right angle with respect to the center axis of the bearing. Namely, the cross-sectional shape of the orbit formed by the respective orbital surfaces is substantially a polygon. Rollers 14 (FIG. 7), 15 (FIG. 8) and 16 (FIG. 9) having through-holes through the center axis are interposed between the respective orbital surfaces. The roller 14 is mainly subjected to a load in a first axial direction. Also, the roller 15 is mainly subjected to a load in a second axial direction. Furthermore, the roller 16 is mainly subjected to a load in a radial direction.

FIG. 10 is an enlarged view of a part of FIG. 7. Each orbital surface is formed to have a radius R in cross section along the radial direction. The rolling surface 14a (15a, 16a) of the roller 14 (15, 16) formed to have a radius r in cross section along the radial direction. The relationship, R>r, is established. Also, in some cases, R= , is established. Furthermore, the through holes 14c, 15c and 16c are formed through the center axis of the respective rollers 14, 15, and 16.

Figure 11A:
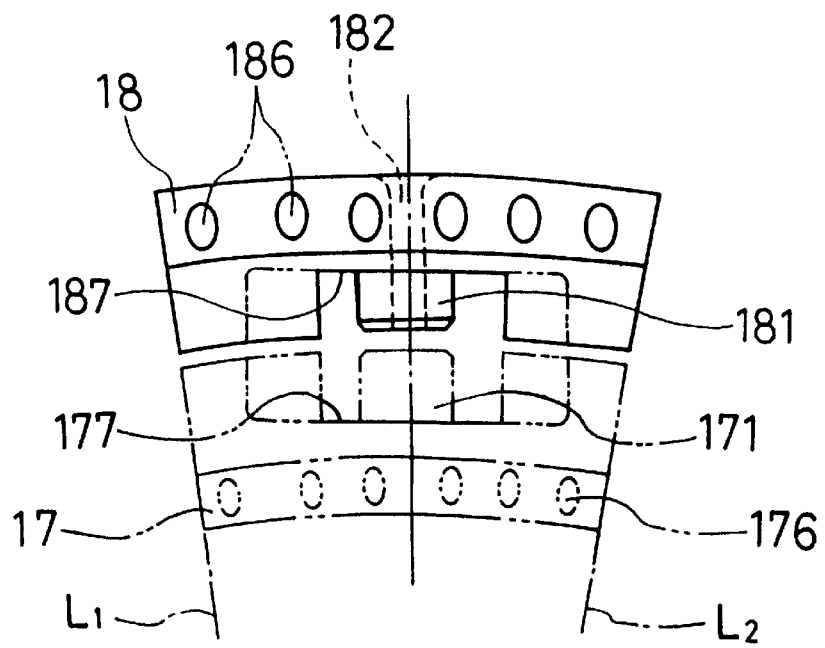
FIGS. 11(a) and 11(b) are a side elevational view and a bottom view of the retainers shown in FIG. 7.
Figure 11B:
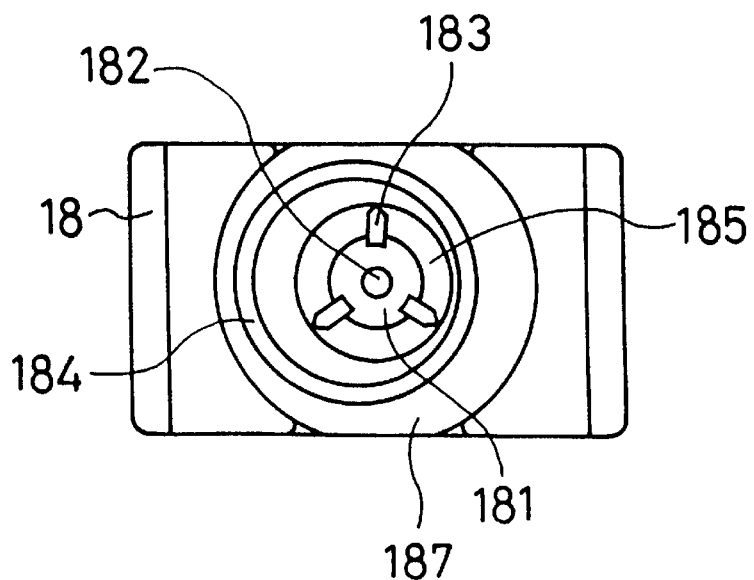

The relationship between the roller 14 and the orbital surfaces 12b and 13b will now be mainly described. As shown in FIGS. 7 and 10, a retainer 17 is disposed in a space formed between one of the end faces 14b of the roller 14 and the orbital surface 12b and 12c. Further, a retainer 18 is disposed in a space formed between the other end faces 14b of the roller 14 and the orbital surface 13b and 13c. As shown by dotted lines and solid lines in FIG. 7. the cross-sectional shape of each of the retainers 17 and 18 is a substantially pentagonal shape obtained by dividing the substantially hexagonal cross-sectional shape. FIG. 11(a) is a side elevational view showing the retainer 17 and 18 as viewed in a direction indicated by the arrow E, and FIG. 11(b) is a bottom view of the retainer 18. As shown in FIG. 11(a), the side elevational shapes of the retainers 17 and 18 are arcuate shapes obtained by cutting and removing a part of the annular member. In the case where the sum of the number of the rollers 14 to 16 used in the cross roller bearing 11 is N, the length of the arcuate shape is a length obtained by dividing the overall circumference of the orbit by N. Then, the retainers adjacent to each other in the circumferential direction are brought into contact with each other. Accordingly, the extension lines $L_1$ and $L_2$ of the retainers 17 and 18 are caused to intersect with each other at the center axis of the cross roller bearing 11.

The retainers 17 and 18 will now be described in more detail. As shown in FIGS. 7 and 11, the retainers 17 and 18 have shaft portions 171 and 181 engaged with the through hole 14c of the roller. Through holes 172 and 182 are formed in the shaft portions 171 and 181, and oil sumps 173 to 176 and oil sumps 183 to 186 are formed in the contact surfaces with the orbital surfaces and the contact surface with the roller side surfaces and the outer walls of the shaft portions, respectively. The oil sumps 173 and 183 are a plurality of grooves formed from the end of the shaft portion 181 to the base end portion on the side walls of the shaft portion 181. The oil sumps 174 and 184 are annular grooves having a center eccentric to the shaft portions 181. Thus, when the oil sumps 174 and 184 are eccentric, the oil sumps 174 and 184 face the end face 14b in the wide range when the roller 14 is rotated. As a result, the lubrication between the retainer 18 and the roller end face 14b is more effective. The oil sumps 175 and 185 are annular grooves concentric with the shaft portion 181. The oil sumps 176 and 186 are provided by forming recesses in the contact surface with the orbital surfaces 13b and 13c.

Then, as shown in FIG. 11, sleeve-like recesses 177 and 187 for encasing the roller 14 (FIG. 7) are formed in a central portion of the radially inward surface. Furthermore, the above- described shaft portions 171 and 181 are projected to that central portion. By the way, the structure of each part of the retainer 17 is arranged in the opposite order to that for the retainer 18 in the radial direction of the bearing. Then, the annular recess portions 177 and 187 and the shaft portions 171 and 181 are caused to face each other, respectively, to thereby hold the roller 14 rotatably. The retainers 17 and 18 are made of high molecule resin, super-super particle material or the like so that they can be elastically deformed. Then, the angular change between the orbital surfaces and the roller 14 to be described later is allowed. Also, the retainers 17 and 18 are solid parts as shown but may be formed by bending a plate member in the same holding manner as for the conventional bearing.

Figure 12A:
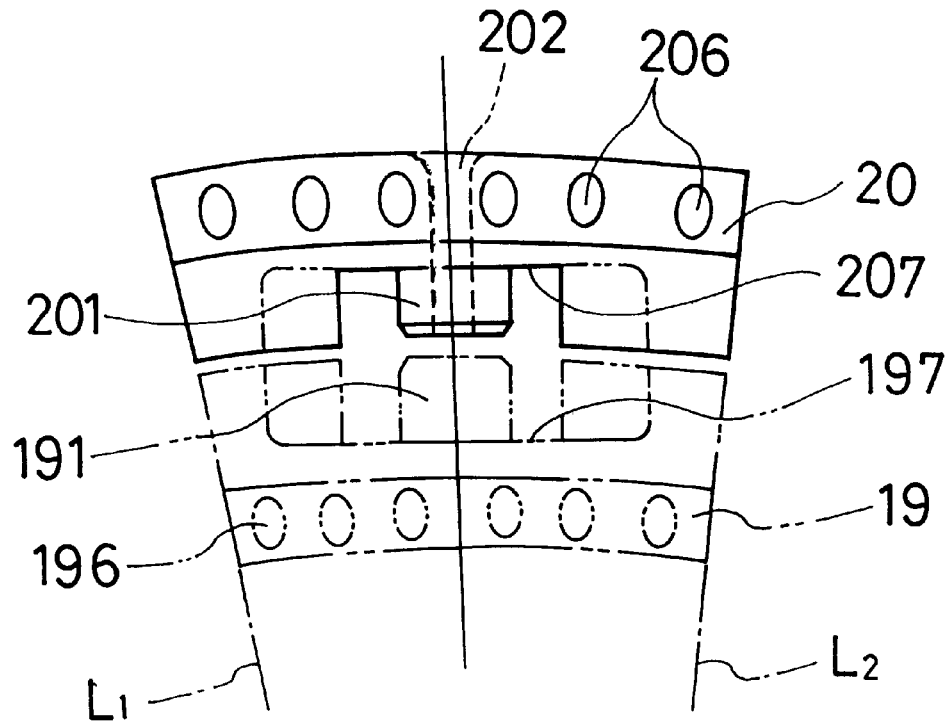
FIGS. 12(a) and 12(b) are a side elevational view and a bottom view of the retainers shown in FIG. 8.
Figure 12B:
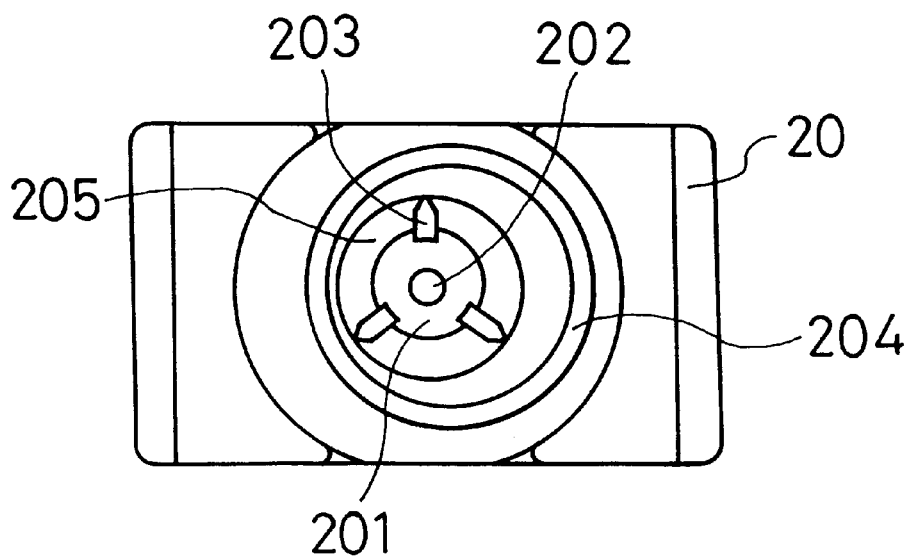
Figure 13:
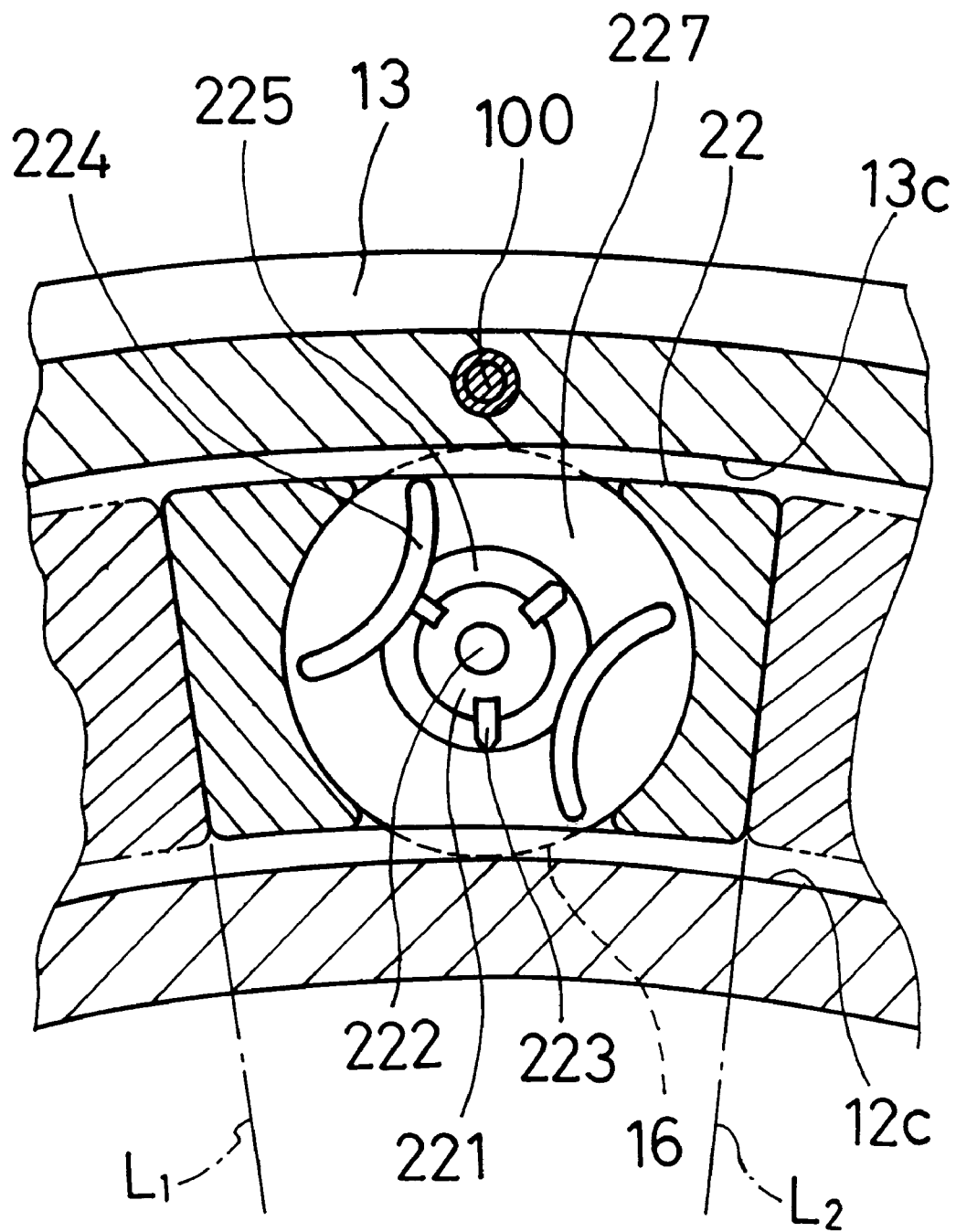
FIG. 13 is a bottom view of the retainer shown in FIG. 9 and a cross-sectional view, in the circumferential direction, of inner and outer races.

The retainers 19 and 20 shown in FIG. 8 and FIG. 12 may be explained by the same description of the retainers 17 and 18. These retainers 19 and 20 are simply shown in the drawings without duplicated detailed description. The structures of the retainers 21 and 23 shown in FIGS. 9 and 13 are substantially the same as those of the retainers 17 and 18. However, since the direction of the end face 16b of the roller 16 is identical with the radial direction of the cross roller bearing 11 (G—G direction), the retainers 21 and 22 are caused to face each other about the G—G line. Accordingly, the retainers 21 and 22 take an exact symmetric shape unlike the relationship between the retainer 17 and 18. By the way, two oil sumps 224 in the retainer 22 are arcuate grooves that are independent of each other. Also, with this shape, the end face 16b are caused to face the oil sump 224 in the wide range when the roller 16 is rotated so that the lubrication between the retainer 18 and the roller end face 14b may be well attained.

As described above, the cross roller bearing 11 is defined by the combination of three kinds of rollers 14, 15 and 16 and the respective retainers 17 and 18, 19 and 20, and 21 and 22 as shown in FIGS. 7 to 9. Then, the respective retainers are combined and brought into intimate contact with each other in the orbit to thereby form the annular retainer assembly. A pitch of each roller may be always kept uniform by these retainers. By the way, the arrangement pattern of the above-described three kind of rollers and the retainers may be changed variously. Assuming that the combination shown in FIG. 7 is represented by α, the combination shown in FIG. 8 is represented by β and the combination shown in FIG. 9 is represented by γ, in the case where the combinations are as follows: γ,α, β,γ,α, β,γ, . . . , it is possible to form the cross roller bearing that may receive the loads in the first and second axial direction and the load in the radial direction substantially uniformly.

Also, in the case where the order, given as: γ, α, γ, β, γ, α, γ. . . . , is adopted (the ratio of the combination γ to the combinations α and β is 2:1), it is possible to form a cross roller bearing in which the allowable load particularly in the radial direction is large. In addition, by setting the arrangement pattern variously, it is possible to form a desired cross roller bearing.

The advantages obtained by the cross roller in accordance with the second embodiment are as follows. A plural pairs of orbital surfaces 12a, 13a, 12b, 13b, 12c and 13c having the different angles relative to the center axis are arranged in the inner race 12 and the outer race 13. The rollers 14, 15 and 16 are disposed along the respective orbital surfaces. Thus, it is possible to receive mainly the load in the first axial direction by the roller 14, mainly the load in the second axial direction by the roller 15 and mainly the load in the radial direction by the roller 16.

By the way, since the relationship between R and r, in radial cross section, of the respective orbital surfaces and the rolling surfaces of the rollers is R>r, when the rollers 14, 15 and 16 are rotated by the loads from the respective orbital surfaces, the mutual contact points are moved so as to balance the directions of the working forces generated between the respective orbital surfaces and the rolling surfaces 14a, 15a and 16a of the rollers to thereby change suitably the angles between the rollers and the orbital surfaces. In this case, the contact points are moved to a position where the circumferential length of the orbital surfaces and the circumferential length of the rolling surfaces are identical with each other, resulting In prevention of the slippage between the orbital surfaces and the rolling surfaces of the rollers. Also, the retainers 17, 18, 19, 20, 21 and 22 for supporting the rollers are disposed in a space defined by the roller end faces 14b, 15b and 16b and the respective orbital surfaces and may be elastically deformed. It is possible to increase the pressure receiving area by a Hertz stress to be described later, while positioning the rollers. Accordingly, even if a predetermined pre-pressure is given to the cross roller bearing 11, there is no fear of heat sticking. It is therefore possible to provide the bearing with high precision at a high rotational speed.

Also, the through holes 14c, 15c and 16c are formed so that the deformation caused by the load to the rollers is likely to occur. When the loads are applied to the roller, the rolling surfaces 14a, 15a and 16a are deformed in an elliptical shape to increase the radius r. Then, the Hertz stress generated between the rolling surfaces of the rollers and the orbital surfaces of the races is reduced to thereby enhance the durability as the bearing. Also, in the rollers 7 and 8 in accordance with the first embodiment, if the through holes are formed through the central axes, it is possible to obtain the same effect. Also, the through holes 14c, 15c and 16c are formed through the center axes of the respective rollers, and the shaft portions 171, 181, 191, 201, 211 and 221 of the respective retainers are engaged with the through holes so that the positioning between the rollers and the retainers is insured and the movement of the retainer in accordance with the rotation of the rollers may be performed without fail.

Furthermore, the respective oil sumps 173 to 176, 183 to 186, 193 to 196, 203 to 206, 213 to 216 and 223 to 226 are formed in the contact surfaces with the orbital surfaces and the contact surfaces with the roller side surfaces and the shaft portions so that the lubrication is well performed among the rollers, and the respective orbital surfaces of the retainers, the inner race and the outer race. Accordingly, the rotation of each roller is smoothened to reduce the rotational resistance of the cross roller bearing and to enhance the durability thereof.

By the way, in the embodiment, there are provided the three pairs of rollers and the orbital surfaces. However, it is possible to provide four or more pairs of rollers and orbital surfaces. Also, it is possible to change the angles of the three pairs of rollers and orbital surfaces relative to the center axis of the bearing variously in the same manner as described in the first embodiment.

Figure 14:
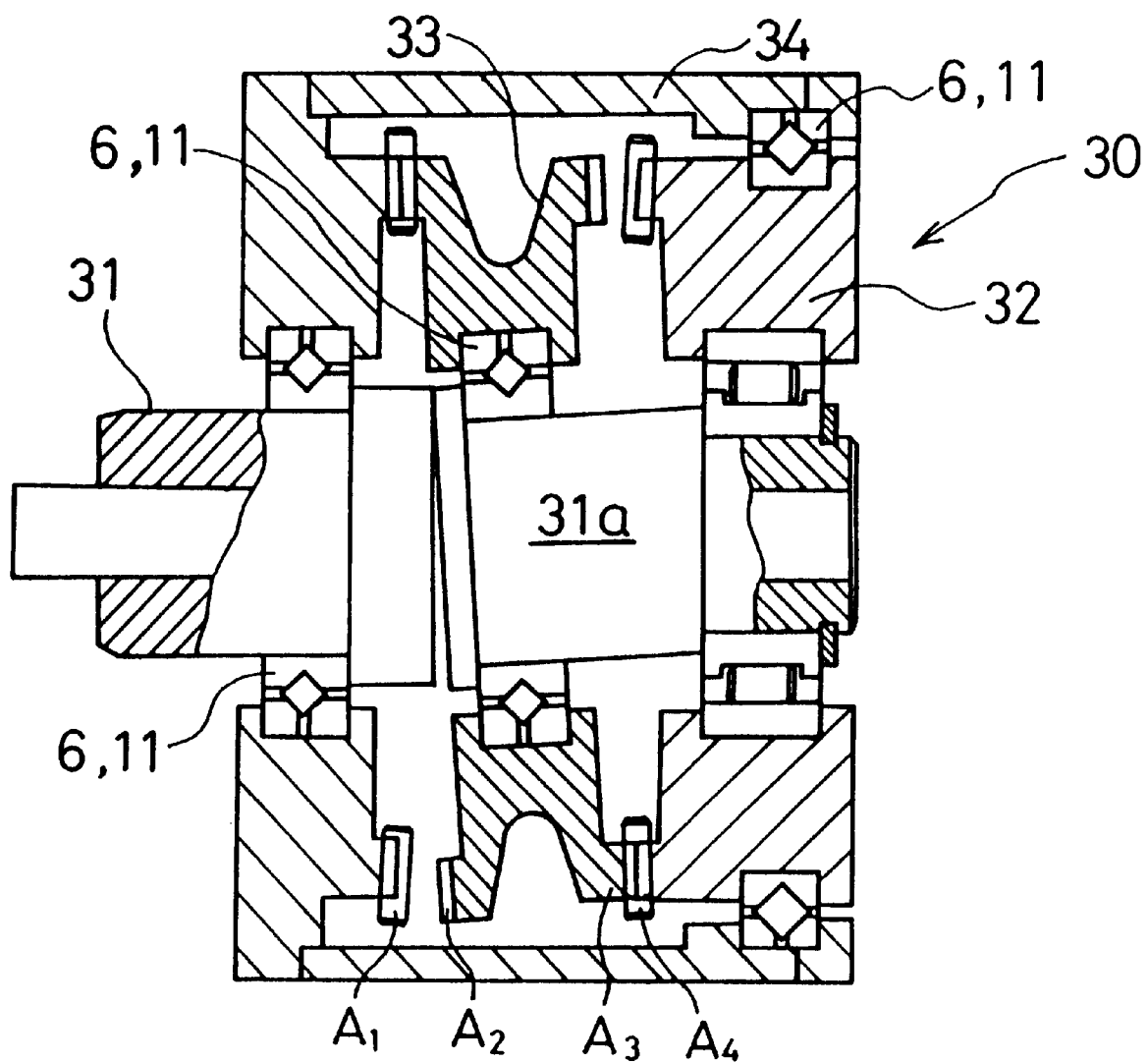
FIG. 14 is a cross-sectional view showing a Coriolis gear device in accordance with a third embodiment of the invention.
Figure 15:
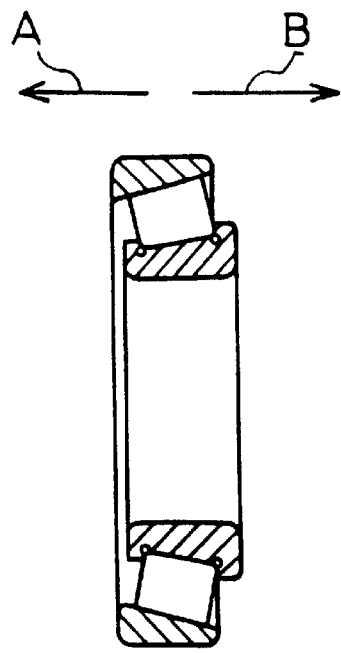
FIG. 15 is a cross-sectional view showing a conical roller bearing.
Figure 16:
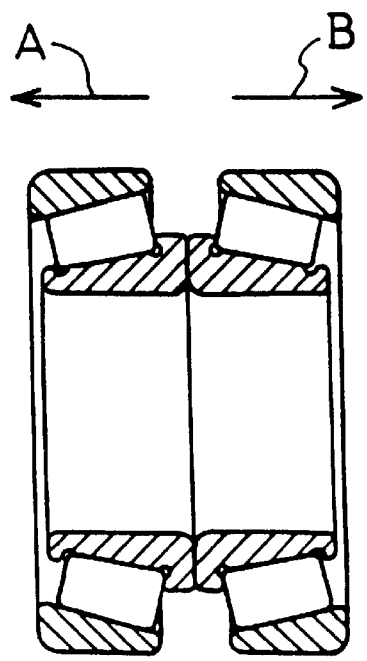
FIG. 16 is a cross-sectional view showing a back-to-back bearing.
Figure 17:
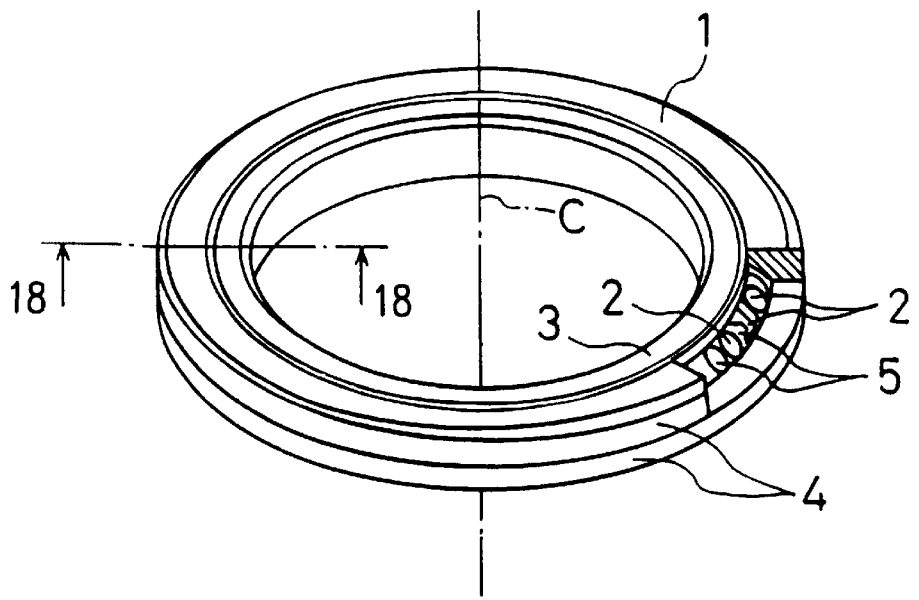
FIG. 17 is a perspective view showing a conventional cross roller.
Figure 18:
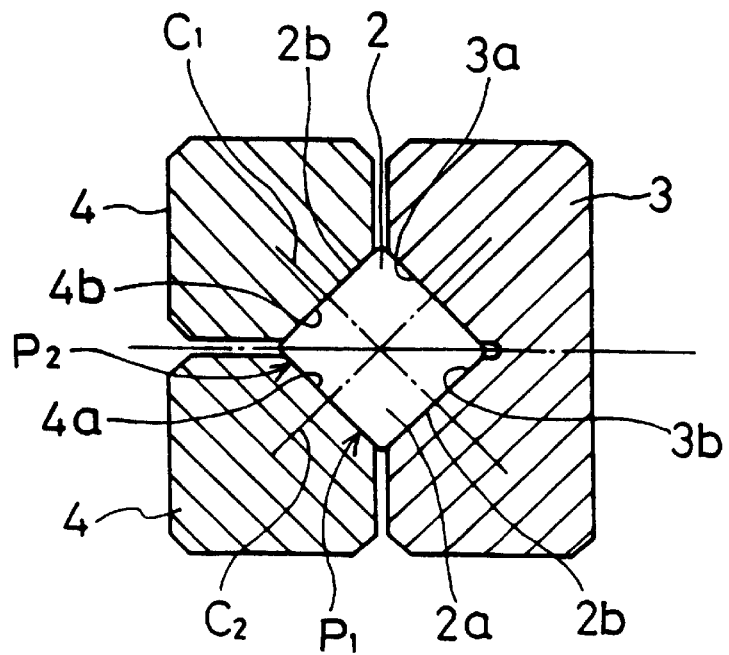
FIG. 18 is a cross-sectional view taken along the line D—D of FIG. 17.

A third embodiment of the invention will now be described with reference to FIG. 14. In this embodiment, the cross roller bearings 6 or 11 exemplified in the first and second embodiments are used in a Coriolis gear device. The present inventor discloses the detail of the Coriolis gear device in Japanese Patent Examined Publication No. Hei 7-56324. The concept of that will briefly be described. Thee Coriolis gear device has first to fourth gears $A_1$ to $A_4$ as four gears having different numbers of teeth. Among these gears, the first gear $A_1$ is a fixed gear formed on a housing 34. The second gear $A_2$ and the third gear $A_3$ are formed integrally with a rotary member 33. Also, the rotary member 33 is rotatably pivoted by a slant portion 31a of an input shaft 31. Also, the fourth gear A4 is provided on an output shaft 32 and is rotatably pivoted by the housing 34. Then, the first, second, third and fourth gear $A_1$ to $A_4$ are engaged with each other.

This Coriolis gear device is advantageous that it may be realized with a high reduction gear ratio only with the first, second, third and fourth gear $A_1$ to $A_4$. According this embodiment, by using the cross-roller bearings 6 or 11 as the bearing of the Coriolis gear, in comparison with the case where the conventional bearings are used in combination, it is possible to reduce a volume of the bearings in the Coriolis gear device and to miniaturize the Coriolis gear device. Accordingly, it is possible to broaden the application field of the Coriolis gear device.

The thus described invention has the following advantages. First of all, in a cross roller bearing according to claim 1 of the invention, the roller shape is cylindrical so that the conical roller is rotated in alignment with the orbital surfaces having different circumferential lengths at different places on the same surface. It is therefore possible to obviate the slippage between the roller and the orbital surfaces. Also, the elastically deformable seat ring is disposed in a space defined by the large end faces of the conical rollers and the orbital surfaces of the outer race, and the seat ring is elastically deformed in this space. Accordingly, it is possible to impart a suitable pre-pressure to the first and second conical rollers by its restoring force. Accordingly, it is possible to obtain the cross roller bearing that is also suitable for the high speed rotation with high precision.

Also, in a cross roller bearing according to claim 2 of the invention, since the radially outward end portions of the seat ring having a U-shaped cross section are brought into contact with the outer race, and the radially inward end portion thereof is brought into contact with the large end faces of the first and second conical rollers, the open end portions of the rollers are subjected to a load from the outer race and the radial inward end portion forming the curved surface is uniformly subjected to the load from the large end faces of the rollers having different rotary centerlines so that the seat ring is deformed. Accordingly, it is possible to always impart suitable pre-pressure to the conical rollers, the inner race and the outer race by the resilient force generated in the seat ring. Accordingly, it is possible to obtain the cross roller bearing that may rotate with high precision.

Also, in a cross roller bearing according to claim 3 of the invention, a plurality of pairs of orbital surfaces having different angles with respect to the rotational center are provided and the rollers are disposed for the respective orbital surfaces so that it is possible to receive the load is in both the axial and radial directions. Also, the radial cross sections of the rolling surfaces of the rollers and the orbital surfaces are formed so as to establish the relationship, R>r. As a result, the angles between the rollers and the orbital surfaces may be suitably changed so that the slippage between the orbital surface and the rolling surfaces of the rollers may be prevented. Furthermore, the retainers that may be elastically deformed are provided in the respective spaces defined by the end faces of the rollers and the orbital surfaces. The retainers are in contact with each other while allowing the angular change between the rollers and the orbital surfaces to thereby position the respective rollers without fail. Accordingly, it is possible to obtain the cross roller bearing that is also suitable for the high speed rotation with high precision.

Furthermore, in a cross roller bearing according to claim 4 of the invention, through holes are formed in the center axes of the rollers so that the rollers are liable to be deformed when they receive the loads. Then, the rotating surfaces are deformed in elliptical shapes upon the application of the load so that the radius of the portions that contact with the orbital surfaces of the race is increased to thereby reduce the Hertz stress generated between the rolling surfaces of the rollers and the orbital surfaces of the races. Accordingly, it is possible to enhance the durability as the bearing. Also, the retainers have the axial portions that engage with the through holes so that the retainers may be moved in accordance with the movement of the rollers without fail.

Also, in a Coriolis gear device according to claim 6 of the present invention, the cross roller bearing according to claim 1–5 of the invention, is used as a bearing for the gears so that the volume of the bearing that occupies the space for the Coriolis gear device is reduced. As a result, it is possible to reduce the size of the Coriolis gear device. Accordingly, it is possible to expand the applicable range of the Coriolis gear device that may obtain a large speed reduction ratio with four gears.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What I claim is:

1. A cross roller bearing for supporting rollers, having different directional rotary axes with common inner and outer races, characterized in that a first conical roller for receiving loads in a first axial direction and a radial direction and a second conical roller for receiving loads in a second axial direction and the radial direction are alternatively arranged, a predetermined space is provided between large end faces of the first and second conical rollers and orbital surfaces of the outer race, and a seat ring that may be elastically deformed is provided in the space.

2. The cross roller bearing according to claim 1, characterized in that said seat ring forms a U-shaped cross section having an open end portion directed radially outwardly, and the radially outward end portion is used as a contact portion with the outer race, whereas a radially inward end portion thereof is used as a contact portion with large end faces of said first and second conical rollers.

3. A Coriolis gear device characterized in that the cross roller bearing according to claim 1 is used in a bearing for gears.

4. A cross roller bearing for supporting rollers, having different directional rotary axes with common inner and outer races, characterized in that a plurality of pairs of orbital surfaces having different angles relative to a center axis are provided in the inner and outer races, a relationship, R>r, is established where R is the radius of the orbital surfaces in radial cross section and r is the radius of rolling surfaces of rollers guided by the orbital surfaces, in radial cross section, and retainers that are elastically deformable are disposed in respective spaces defined by end faces of the rollers and the orbital surfaces so that the adjacent retainers may be in contact with each other.

5. The cross roller bearing according to claim 4, characterized in that through holes are formed through center axes of the rollers and axial portions that engage with the through holes are formed in the retainers.

6. The cross roller bearing according to claim 4, characterized in that the number of the orbital surfaces are three or more pairs.

* * * * *